(12) United States Patent
Hong

(10) Patent No.: US 12,445,921 B2
(45) Date of Patent: Oct. 14, 2025

(54) INFORMATION SENDING METHOD, BASE STATION SWITCHING METHOD, INFORMATION RECEPTION METHOD AND APPARATUS

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 481 days.

(21) Appl. No.: 17/926,308

(22) PCT Filed: May 21, 2020

(86) PCT No.: PCT/CN2020/091670
§ 371 (c)(1),
(2) Date: Nov. 18, 2022

(87) PCT Pub. No.: WO2021/232381
PCT Pub. Date: Nov. 25, 2021

(65) Prior Publication Data
US 2023/0232296 A1    Jul. 20, 2023

(51) Int. Cl.
*H04W 36/00*    (2009.01)
*H04W 36/08*    (2009.01)
(Continued)

(52) U.S. Cl.
CPC ....... *H04W 36/0085* (2018.08); *H04W 36/08* (2013.01); *H04W 36/38* (2013.01); *H04W 88/06* (2013.01)

(58) Field of Classification Search
CPC .. H04W 36/0085; H04W 36/08; H04W 36/38
See application file for complete search history.

(56) References Cited

U.S. PATENT DOCUMENTS 11,864,035 B2 *   1/2024   Rugeland .......... H04W 36/0022
2013/0303203 A1   11/2013  Wang et al.
(Continued)

FOREIGN PATENT DOCUMENTS

CN   104509161 A   4/2015
CN   107567716 A   1/2018
(Continued)

OTHER PUBLICATIONS

ISA State Intellectual Property Office of the People's Republic of China, International Search Report Issued in Application No. PCT/CN2020/091670, Feb. 22, 2021, WIPO, 4 pages.
(Continued)

*Primary Examiner* — Wayne H Cai
(74) *Attorney, Agent, or Firm* — Volpe Koenig

(57) ABSTRACT

The present disclosure provides an information sending method, including in response to determining that a second SIM card in a connected state satisfies a handover condition for handing over the second SIM card from a first base station to a second base station, sending context information of a first SIM card to the first base station through the second SIM card, wherein the first SIM card is in an inactive state. According to the technical solutions of the present disclosure, the first SIM card does not need to send the context information to the second base station separately, nor temporarily adjust its state, thus the times of communication between the terminal and the base station are reduced, the communication progress is simplified and the communication resources are saved.

19 Claims, 13 Drawing Sheets

(51) Int. Cl.
*H04W 36/38* (2009.01)
*H04W 88/06* (2009.01)

(56) References Cited

U.S. PATENT DOCUMENTS

| | | |
|---|---|---|
| 2015/0065106 A1 | 3/2015 | Catovic et al. |
| 2015/0146688 A1 | 5/2015 | Yasuda et al. |
| 2015/0181470 A1 | 6/2015 | Chai et al. |
| 2016/0323933 A1 | 11/2016 | Song et al. |
| 2017/0150545 A1 | 5/2017 | Ramkumar et al. |
| 2017/0164245 A1 | 6/2017 | Chai et al. |
| 2018/0007583 A1 | 1/2018 | Hong et al. |
| 2018/0220341 A1 | 8/2018 | Dai et al. |
| 2018/0255487 A1 | 9/2018 | Chai et al. |
| 2019/0274075 A1 | 9/2019 | Chai et al. |
| 2022/0264405 A1 | 8/2022 | Hong |
| 2022/0278731 A1 | 9/2022 | Koskela et al. |
| 2025/0159564 A1* | 5/2025 | Duan ................ H04W 36/0066 |

FOREIGN PATENT DOCUMENTS

| | | |
|---|---|---|
| CN | 109819487 A | 5/2019 |
| CN | 110495194 A | 11/2019 |
| CN | 110495208 A | 11/2019 |
| EP | 4152818 A1 | 3/2023 |
| WO | 2014/022970 A1 | 2/2014 |
| WO | 2017/054572 A1 | 4/2017 |
| WO | 2018/121644 A1 | 7/2018 |
| WO | 2019/192713 A1 | 10/2019 |

OTHER PUBLICATIONS

Huawei et al."Overview of Rel-17 work areas for NR and LTE""3GPP TSG RAN Meeting #84 RP-191486 Newport Beach, USA, Jun. 3-6, 2019" Jun. 6, 2019, 22 pages.

European Patent Office, Extended European Search Report Issued in Application No. 209362599, Jan. 19, 2024, Germany, 11 pages.

People's Republic of China, Office Action and Search Report Issued in 20, 2023, 15 pages.

State Intellectual Property Office of the People's Republic of China, Office Action and Search Report Issued in Application No. 202080001007.9, Jun. 20, 2023, 15 pages.

India Office Action issued on Feb. 20, 2023 for Indian Patent Application No. 202247069125.

ISA State Intellectual Property Office of the People's Republic of China, Written Opinion of the International Searching Authority Issued on Feb. 22, 2021 for Chinese Patent Application No. PCT/CN2020/091670.

* cited by examiner

INFORMATION SENDING METHOD, BASE STATION SWITCHING METHOD, INFORMATION RECEPTION METHOD AND APPARATUS

CROSS-REFERENCE TO RELATED APPLICATION

The present application is the U.S. national phase of PCT Application No. PCT/CN2020/091670 filed on May 21, 2020, which is incorporated herein by reference in its entirety.

TECHNICAL FIELD

The present disclosure relates to the field of communication technologies, and in particular to information sending methods, base station handover methods, information receiving methods, information sending apparatuses, base station handover apparatuses, information receiving apparatuses, an electronic device and a computer readable storage medium.

BACKGROUND

In 5G new radio (NR), in addition to the RRC_CONNECTED state (may also be referred to as connected state) and RRC_IDLE (may also be referred to as idle state), the state of the terminal further includes the RRC_INACTIVE state (may also be referred to as inactive state).

In a terminal including multiple subscriber identity module (SIM) cards, different SIM cards may be considered as different terminals by a network. When there is a SIM card in the inactive state and a SIM card in the connected state, a communication process between the SIM cards in different states and a base station becomes more complex, as a result, more communication resources are occupied.

SUMMARY

In view of the above, the embodiments of the present disclosure provide information sending methods, base station handover methods, information receiving methods, information sending apparatuses, base station handover apparatuses, information receiving apparatuses, an electronic device and a computer readable storage medium, so as to solve the problems in related arts.

According to a first aspect of embodiments of the present disclosure, there is provided an information sending method, which is applied to a terminal and includes:
  in response to determining that a second SIM card in a connected state satisfies a handover condition for handing over the second SIM card from a first base station to a second base station, sending context information of a first SIM card to the first base station through the second SIM card, where the first SIM card is in an inactive state.

According to a second aspect of embodiments of the present disclosure, there is provided a base station handover method, which is applied to a first base station and includes:
  receiving context information of a first SIM card in an inactive state in a terminal from a second SIM card in a connected state in the terminal;
  sending the context information of the first SIM card to a core network device.

According to a third aspect of embodiments of the present disclosure, there is provided an information receiving method, which is applied to a second base station and includes:
  Receiving, from a core network device, a handover request signaling for instructing to hand over a second SIM card in a connected state in a terminal from a first base station to the second base station, where the handover request signaling includes context information of a first SIM card in an inactive state in the terminal.

According to a fourth aspect of embodiments of the present disclosure, there is provided a base station handover method, which is applied to a core network device and includes:
  receiving, from a first base station, a handover required signaling for handing over a second SIM card in a connected state in a terminal from a first base station to a second base station, where the handover required signaling includes context information of a first SIM card in an inactive state in the terminal; and
  sending to the second base station a handover request signaling for handing over the second SIM card from the first base station to the second base station, where the handover request signaling includes the context information of the first SIM card.

According to a fifth aspect of embodiments of the present disclosure, there is provided an information sending apparatus, which is applied to a terminal at least provided with a first SIM card and a second SIM card, and includes:
  a context sending module, configured to, in response to determining that the second SIM card in a connected state satisfies a handover condition for handing over the second SIM card from a first base station to a second base station, send context information of the first SIM card to the first base station through the second SIM card, where the first SIM card is in an inactive state.

According to a sixth aspect of embodiments of the present disclosure, there is provided a base station handover apparatus, which is applied to a first base station and includes:
  a context receiving module, configured to receive context information of a first SIM card in an inactive state in a terminal from a second SIM card in a connected state in the terminal;
  a context sending module, configured to send the context information of the first SIM card to a core network device.

According to a seventh aspect of embodiments of the present disclosure, there is provided an information receiving apparatus, which is applied to a second base station and includes:
  a handover request receiving module, configured to receive a handover request signaling for instructing to hand over a second SIM card in a connected state in a terminal from a first base station to the second base station from a core network device, where the handover request signaling includes context information of a first SIM card in an inactive state in the terminal.

According to an eighth aspect of embodiments of the present disclosure, there is provided a base station handover apparatus, which is applied to a core network device and includes:
  a handover required receiving module, configured to receive, from the first base station, a handover required signaling for handing over a second SIM card in a connected state in a terminal from a first base station to a second base station, where the handover required signaling includes context information of a first SIM card in an inactive state in the terminal;

a handover request sending module, configured to send to the second base station a handover request signaling for handing over the second SIM card from the first base station to the second base station, where the handover request signaling includes the context information of the first SIM card.

According to a ninth aspect of embodiments of the present disclosure, there is provided an electronic device, including:

a processor;

a memory, storing instructions executable by the processor;

where the processor is configured to perform the method of any one of the above embodiments.

According to a tenth aspect of embodiments of the present disclosure, there is provided a computer readable storage medium, storing a computer program, where the computer program is executed by a processor to perform the method of any one of the above embodiments.

BRIEF DESCRIPTION OF THE DRAWINGS

In order to more clearly describe the technical solutions in the embodiments of the present disclosure, the drawings required for descriptions of the embodiments of the present disclosure will be briefly introduced below. Apparently, the drawings described hereunder are only some embodiments of the present disclosure. Those skilled in the art may obtain other drawings based on these drawings without making creative work.

DETAILED DESCRIPTION OF THE EMBODIMENTS

The technical solutions of the embodiments of the present disclosure will be fully and clearly described below in combination with the drawings in the embodiments of the present disclosure. Apparently, the embodiments described herein are only some embodiments of the present disclosure rather than all embodiments of the present disclosure. Other embodiments obtained by persons of ordinary skill in the art based on these embodiments of the present disclosure without making inventive work shall all fall within the scope of protection of the present disclosure.

Figure 1:
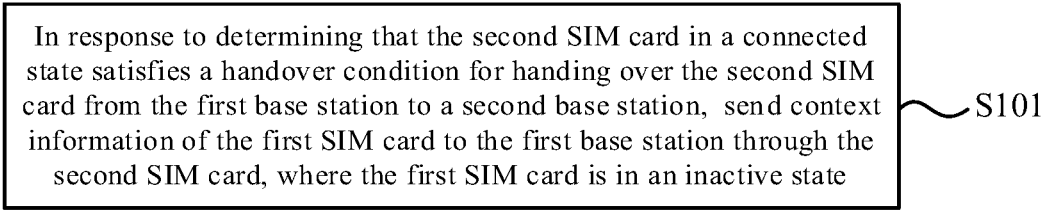
FIG. 1 is a flowchart illustrating an information sending method according to an embodiment of the present disclosure.

FIG. 1 is a flowchart illustrating an information sending method according to an embodiment of the present disclosure. The information sending method in the present embodiment may be applied to a terminal, and the terminal may serve as a user equipment to communicate with a base station. The base station may be a 5G base station, and the terminal may include but not be limited to an electronic device such as a smart phone, a tablet computer, and a wearable device and the like.

The terminal at least includes a first subscriber identity module (SIM) card and a second SIM card. It should be noted that the first SIM card and the second SIM card do not refer to two specific SIM cards but to any two different SIM cards in the terminal.

As shown in FIG. 1, the information sending method at least includes the following steps.

At step S101, in response to determining that the second SIM card in a connected state (in a connected state with a first base station) satisfies a handover condition for handing over the second SIM card from the first base station to a second base station, context information of the first SIM card is sent to the first base station through the second SIM card, where the first SIM card is in an inactive state (in an inactive state with the first base station).

In the related arts, when the terminal hands over an accessed base station, for example, when the second SIM card in the terminal is handed over from the first base station to the second base station, the second SIM card completes a change of a communication path. In this case, other SIM cards in the terminal usually need to change their communication paths accordingly. For example, for the first SIM card in an inactive state, in order to enable the second base station to communicate with the first SIM card in time, the context information of the first SIM card needs to be sent to the second base station. But, because the first SIM card is in an inactive state, a state of the first SIM card needs to be temporarily adjusted. Specifically, the first SIM card enters a connected state such that context information of the SIM card is sent to the second base station and then resumes the inactive state.

However, in the above process in the related arts, it is required to perform a process of handing over the second SIM card to the second base station as well as a process of sending the context information of the first SIM card to the second base station. The two processes are performed separately, and thus multiple communications with the base station are required. In this case, communication resources are occupied and time consumption is increased.

In the present embodiment, the second SIM card needs to be handed over from the first base station to the second base station in some scenarios. These scenarios include but are not limited to the following.

For example, information such as strengths of signals between different base stations can be detected (for example, according to configuration information such as detection period and detection target sent by the first base station) through the second SIM card to obtain measurement information, and whether to hand over a base station can be determined based on the measurement information. When determining that the second SIM card needs to be handed over from the first base station to the second base station, the context information of the first SIM card may be obtained through the second SIM card.

For example, the first base station may send instruction information for instructing to hand over the second SIM card from the first base station to the second base station to the second SIM card.

Further, when the second SIM card needs to be handed over to the second base station, the context information of the first SIM card may be sent to the first base station, such that the first base station can send the context information of the first SIM card to a core network device (e.g., an access and mobility management function (AMF) in 5G) and the core network device then sends the context information of the first SIM card to the second base station. Hence, the first SIM card does not need to send the context information to the second base station through a separate message nor temporarily adjust the state of the first SIM card, thereby the times of communication between the terminal and the base station are reduced, the communication progress is simplified, and the communication resources are saved.

Figure 2:
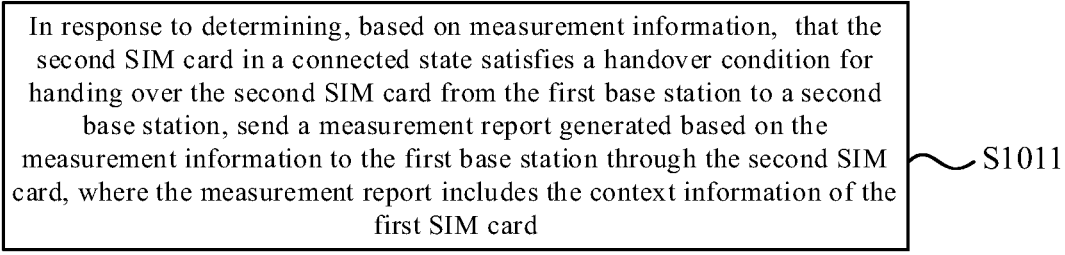
FIG. 2 is a flowchart illustrating an information sending method according to another embodiment of the present disclosure.

FIG. 2 is a flowchart illustrating an information sending method according to another embodiment of the present disclosure. As shown in FIG. 2, the determination is performed based on the measurement information, and sending the context information of the first SIM card to the first base station through the second SIM card includes:

at step S1011, a measurement report generated based on the measurement information is sent to the first base station through the second SIM card, where the measurement report includes the context information of the first SIM card.

In an embodiment, the measurement report for handing over the second SIM card to the second base station can be generated based on the above measurement information, and the measurement report is sent to the first base station. Based on the measurement report, the first base station determines that the second SIM card needs to be handed over to the second base station. Thus, a request for handing over to a base station is sent to the second base station through the core network device, such that the second base station acknowledges that the second SIM card is to be accessed. In this way, the second SIM card can smoothly access the second base station.

In addition, the measurement report sent to the first base station by the second SIM card may also include the context information of the first SIM card, such that the first base station can send the context information of the first SIM card to the core network device, and the core network device then sends the context information of the first SIM card to the second base station. Hence, the second SIM card does not need to send the context information to the first base station through a separate message. Thereby, the times of communication between the terminal and the base station are reduced, the communication progress is simplified, and the communication resources are saved.

Figure 3:
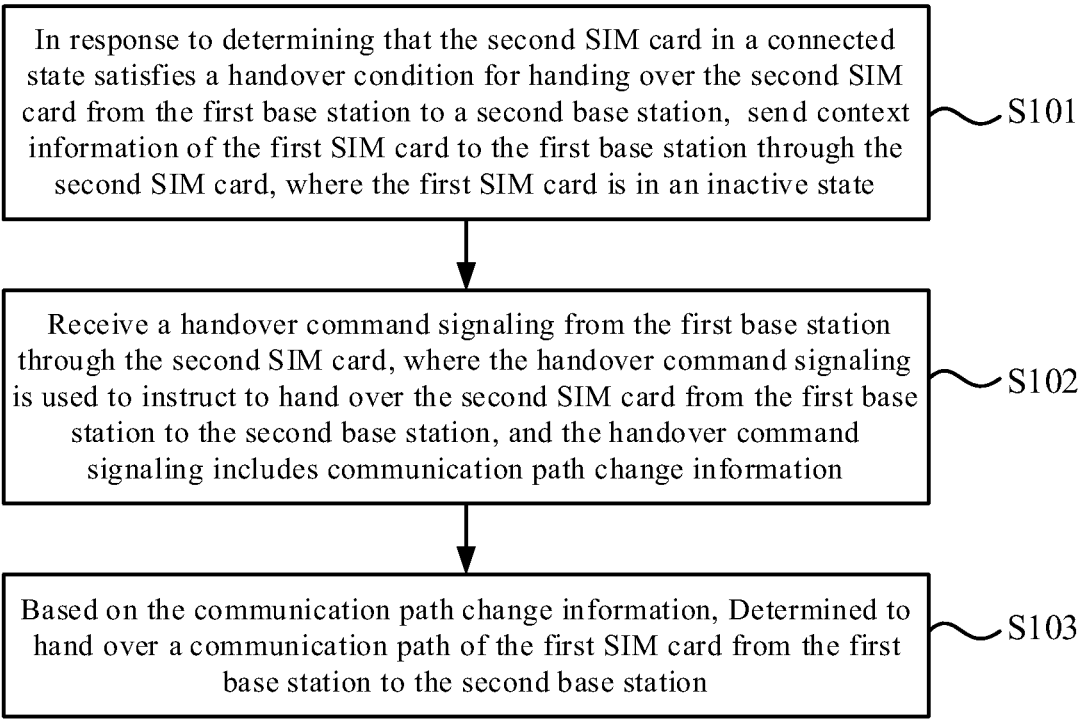
FIG. 3 is a flowchart illustrating an information sending method according to yet another embodiment of the present disclosure.

FIG. 3 is a flowchart illustrating an information sending method according to yet another embodiment of the present disclosure. As shown in FIG. 3, the method further includes the following steps.

At step S102, a handover command signaling is received from the first base station through the second SIM card, where the handover command signaling is used to instruct to hand over the second SIM card from the first base station to the second base station, and the handover command signaling includes communication path change information.

At step S103, based on the communication path change information, it is determined to hand over a communication path of the first SIM card from the first base station to the second base station.

In an embodiment, after the first base station receives the measurement report from the second SIM card, if the second SIM card is allowed to hand over from the first base station to the second base station, or the second SIM card is instructed to hand over from the first base station to the second base station, the first base station may send a handover required signaling to the core network device through an N2 interface, and the core network device sends a handover request signaling to the second base station through an N2 interface. If the second SIM card is allowed to hand over from the first base station to the second base station, the second base station may return a handover request acknowledgement signaling to the core network device through an N2 interface, and then the core network device sends a handover command signaling to the first base station through an N2 interface, and then the first base station sends the handover command signaling to the second SIM card. After receiving the handover command signaling, the second SIM card may be handed over from the first base station to the second base station.

When the second SIM card is handed over from the first base station to the second base station, the communication paths of other SIM cards in the terminal, for example, the communication path of the first SIM card, usually needs to be handed over from the first base station to the second base station. Hence, the communication path change information is included in the handover command signaling such that it is determined to hand over the communication path of the first SIM card from the first base station to the second base station based on the communication path change information. When the first SIM card needs to communicate with the base station subsequently, a communication connection with the second base station may be established (e.g., random access is originated to the second base station).

Further, the handover command signaling includes the communication path change information for instructing the first SIM card to change its communication path. Therefore, the first base station does not need to send the communication path change information through separate signaling, the communication progress is simplified and the communication resources are saved.

Figure 4:
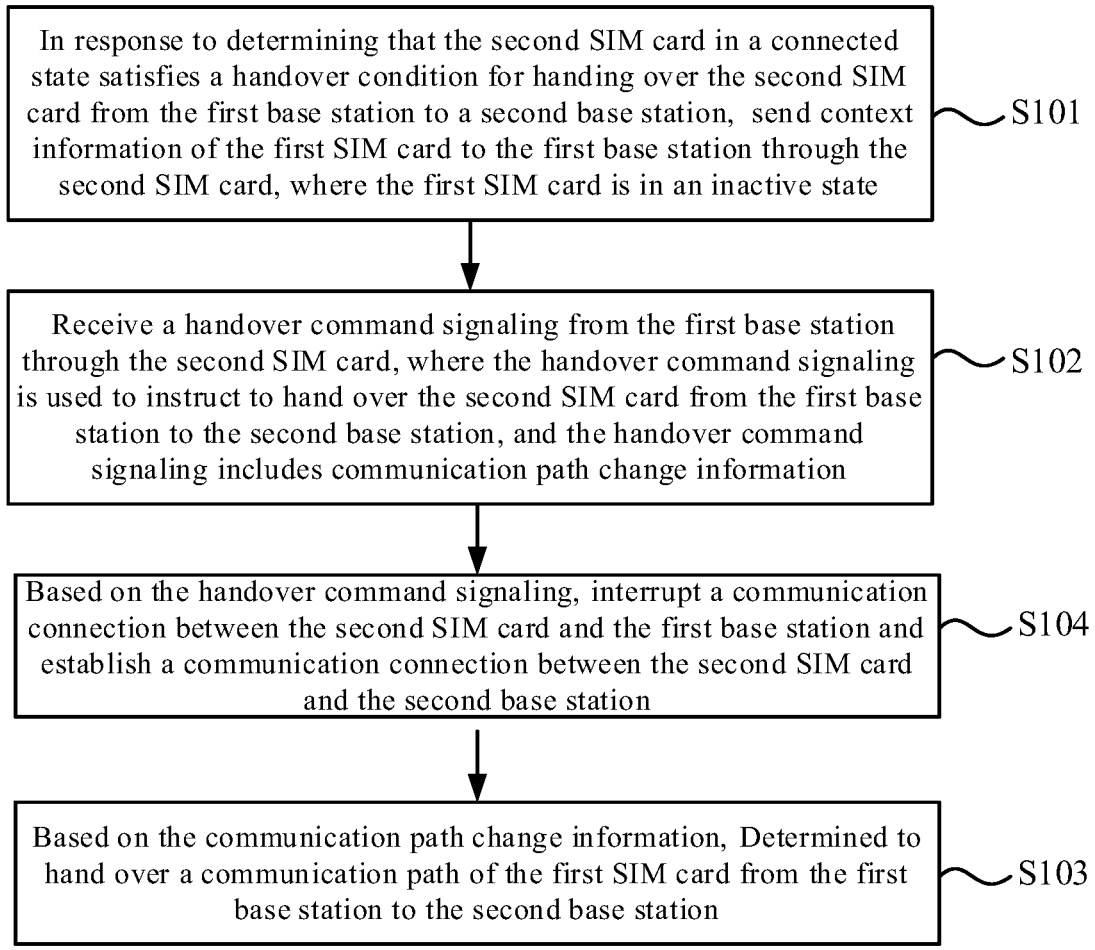
FIG. 4 is a flowchart illustrating an information sending method according to still another embodiment of the present disclosure.

FIG. 4 is a flowchart illustrating an information sending method according to still another embodiment of the present disclosure. As shown in FIG. 4, the method includes the following step.

At step S104, based on the handover command signaling, a communication connection between the second SIM card and the first base station is interrupted, and a communication connection between the second SIM card and the second base station is established.

In an embodiment, after receiving the handover command signaling, a communication connection between the second SIM card and the first base station can be firstly interrupted, and a communication connection between the second SIM card and the second base station can be established, and then the communication path change information can be sent to the first SIM card. Or the communication path change information can be sent to the first SIM card, and then a communication connection between the second SIM card and the first base station can be interrupted, and a communication connection between the second SIM card and the second base station can be established, which may be specifically selected based on actual requirements.

Figure 5:
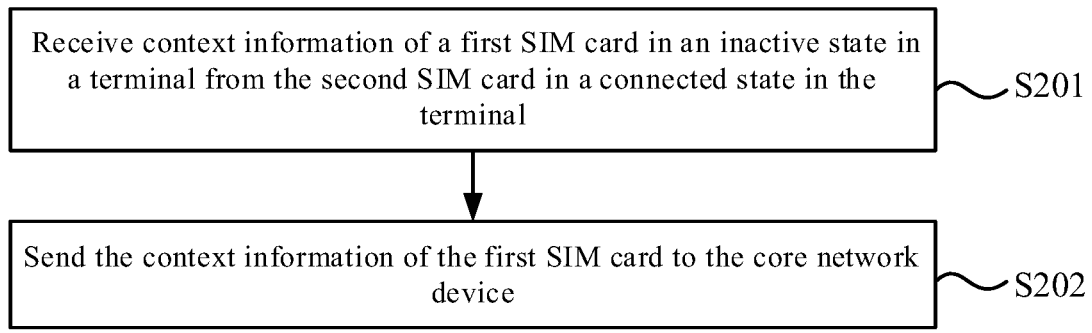
FIG. 5 is a flowchart illustrating a base station handover method according to an embodiment of the present disclosure.

FIG. 5 is a flowchart illustrating a base station handover method according to an embodiment of the present disclosure. The base station handover method in this embodiment may be applied to a base station which may be a 5G base station. The base station may be the first base station in the preceding embodiments to communicate with the terminal, the core network device, and the second base station in the preceding embodiments. The terminal may include but is not limited to an electronic device such as a smart phone, a tablet computer, and a wearable device.

As shown in FIG. 5, the base station handover method may include the following steps.

At step S201, context information of a first SIM card in an inactive state in a terminal is received from the second SIM card in a connected state in the terminal.

At step S202, the context information of the first SIM card is sent to the core network device.

In an embodiment, when the second SIM card needs to be handed over to a second base station, the context information of the first SIM card may be sent to the first base station, such that the first base station can send the context information of the first SIM card to the core network device and the core network device then sends the context information of the first SIM card to the second base station. Hence, the first SIM card does not need to send the context information to the second base station independently nor temporarily adjust its state. Thereby the times of communication between the terminal and the base station are reduced, the communication progress is simplified, and the communication resources are saved.

Figure 6:
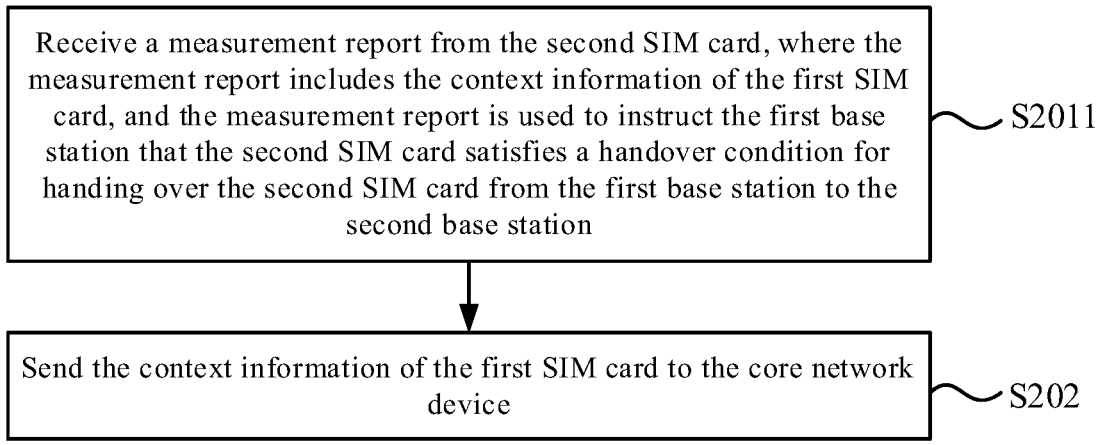
FIG. 6 is a flowchart illustrating a base station handover method according to another embodiment of the present disclosure.

FIG. 6 is a flowchart illustrating a base station handover method according to another embodiment of the present disclosure. As shown in FIG. 6, receiving the context information of the first SIM card in an inactive state in the terminal from the second SIM card in a connected state in the terminal includes:

at step S2011, a measurement report is received from the second SIM card, where the measurement report includes the context information of the first SIM card, and the measurement report is used to instruct the first base station that the second SIM card satisfies a handover condition for handing over the second SIM card from the first base station to the second base station.

In an embodiment, the measurement report for handing over the second SIM card to the second base station can be generated based on the above measurement information, and the measurement report is sent to the first base station. The measurement report sent by the second SIM card to the first base station may further include the context information of the first SIM card. The first base station may send a handover required signaling to the core network device through an N2 interface, where the handover required signaling includes the context information of the first SIM card. Thus, the core network device can send the context information of the first SIM card to the second base station.

Hence, the second SIM card does not need to send the context information of the first SIM card to the first base station through a separate message, the communication progress is simplified, and the communication resources are saved.

Figure 7:
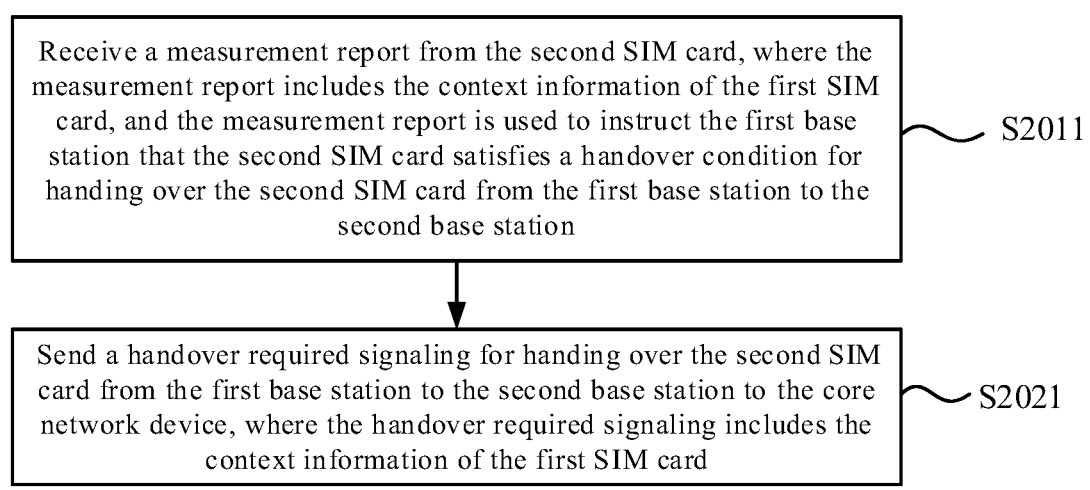
FIG. 7 is a flowchart illustrating a base station handover method according to yet another embodiment of the present disclosure.

FIG. 7 is a flowchart illustrating a base station handover method according to yet another embodiment of the present disclosure. As shown in FIG. 7, sending the context information of the first SIM card to the core network device includes:

at step S2021, a handover required signaling for handing over the second SIM card from the first base station to the second base station is sent to the core network device, where the handover required signaling includes the context information of the first SIM card.

In an embodiment, the first base station may send to the core network device the handover required signaling for handing over the second SIM card from the first base station to the second base station. The context information of the first SIM card is included in the handover required signaling.

Hence, the first base station does not need to send the context information of the first SIM card to the network side device through separate signaling, the communication progress is simplified and the communication resources are saved.

Figure 8:
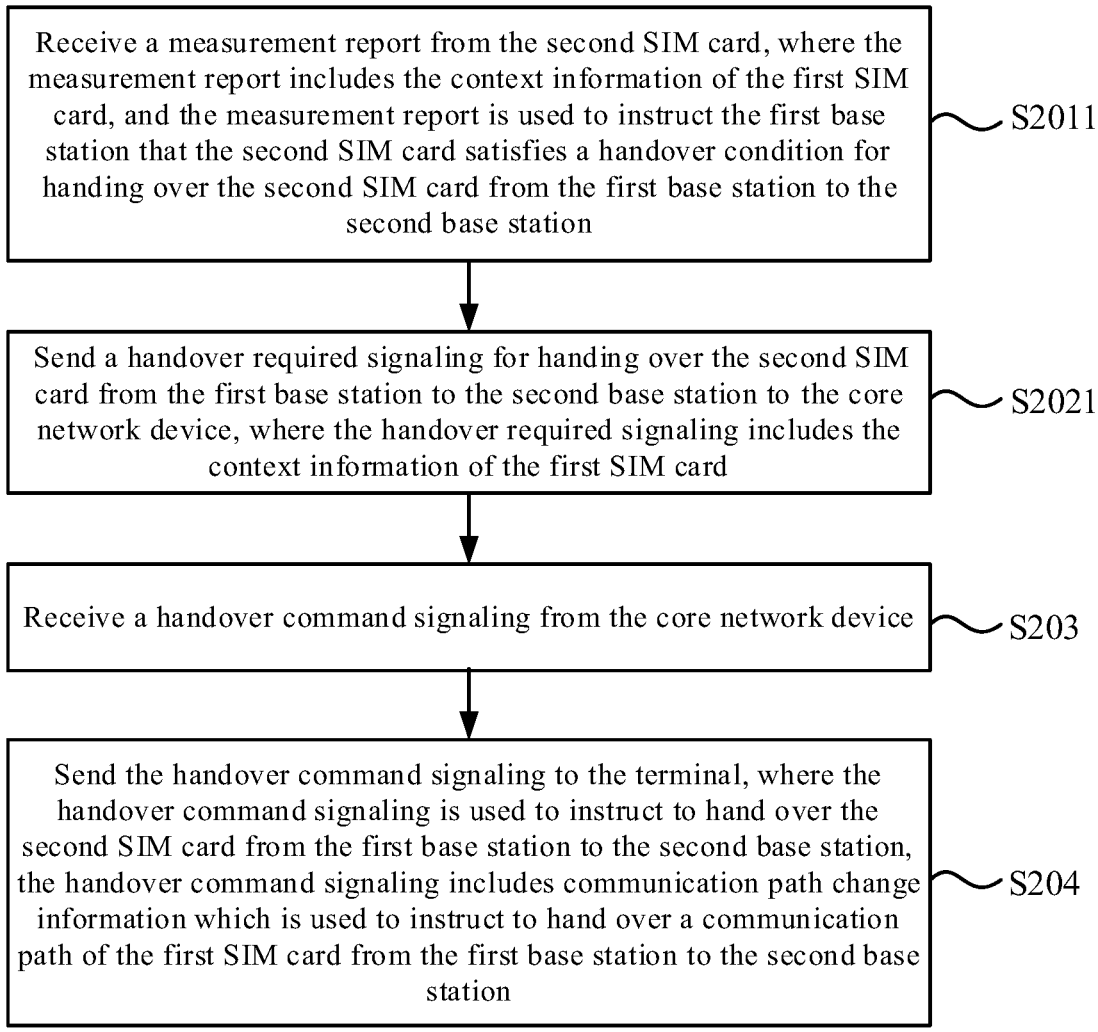
FIG. 8 is a flowchart illustrating a base station handover method according to still another embodiment of the present disclosure.

FIG. 8 is a flowchart illustrating a base station handover method according to still another embodiment of the present disclosure. As shown in FIG. 8, the method includes the following steps.

At step S203, a handover command signaling is received from the core network device.

At step S204, the handover command signaling is sent to the terminal, where the handover command signaling is used to instruct to hand over the second SIM card from the first base station to the second base station, the handover command signaling includes communication path change information which is used to instruct to hand over a communication path of the first SIM card from the first base station to the second base station.

In an embodiment, after receiving a handover request acknowledgement signaling from the second base station, the core network device may determine that the second base station allows the second SIM card to hand over from the first base station to the second base station. Thus, the communication path of the first SIM card with the base station may be handed over from the first base station to the second base station. In this case, the first SIM card can communicate with the second base station when the first SIM card is called subsequently.

In addition, the core network device may also send the handover command signaling to the first base station through an N2 interface, where the handover command signaling carries the communication path change information. After receiving the handover command signaling, the first base station may determine that the second base station allows the second SIM card to hand over from the first base station to the second base station. Thus, the first base station may send the handover command signaling to instruct the second SIM card to be handed over from the first base station to the second base station. Further, because the handover command signaling includes the communication path change information, the communication path change information can be sent to the first SIM card through the second SIM card, to instruct to hand over the communication path between the first SIM card and the base station from the first base station to the second base station.

Hence, the handover command signaling does not need to be sent to the terminal through a separate signaling, the communication progress is simplified and the communication resources are saved.

Figure 9:
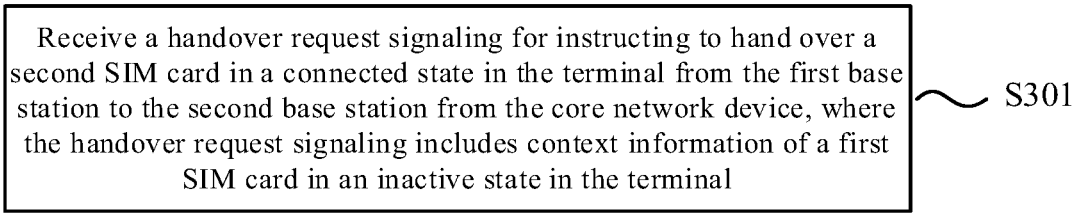
FIG. 9 is a flowchart illustrating an information receiving method according to an embodiment of the present disclosure.

FIG. 9 is a flowchart illustrating an information receiving method according to an embodiment of the present disclosure. The information receiving method in the present embodiment may be applied to a base station. The base station may be a 5G base station, which may be the second base station in the preceding embodiments and can communicate with the terminal, the first base station, and the core network device in the preceding embodiments. The terminal may be but is not limited to an electronic device such as a smart phone, a tablet computer, a wearable device, and the like.

As shown in FIG. 9, the information receiving method may include the following step.

At step S301, a handover request signaling for instructing to hand over a second SIM card in a connected state in the terminal from the first base station to the second base station is received from the core network device, where the handover request signaling includes context information of a first SIM card in an inactive state in the terminal.

In an embodiment, when the second SIM card needs to be handed over to the second base station, the context information of the first SIM card may be sent to the first base station, and the first base station may send the handover required signaling to the core network device through an N2 interface, where the handover required signaling includes the context information of the first SIM card.

Next, the core network device may send the handover request signaling to the second base station through an N2 interface, where the handover request signaling includes the context information of the first SIM card. In this way, the second base station can obtain the context information of the first SIM card, such that the communication with the first SIM card can be quickly resumed based on the context information of the first SIM card subsequently.

In this process, the core network device does not need to send the context information of the first SIM card to the second base station through a separate signaling, the communication progress is simplified and the communication resources are saved.

Figure 10:
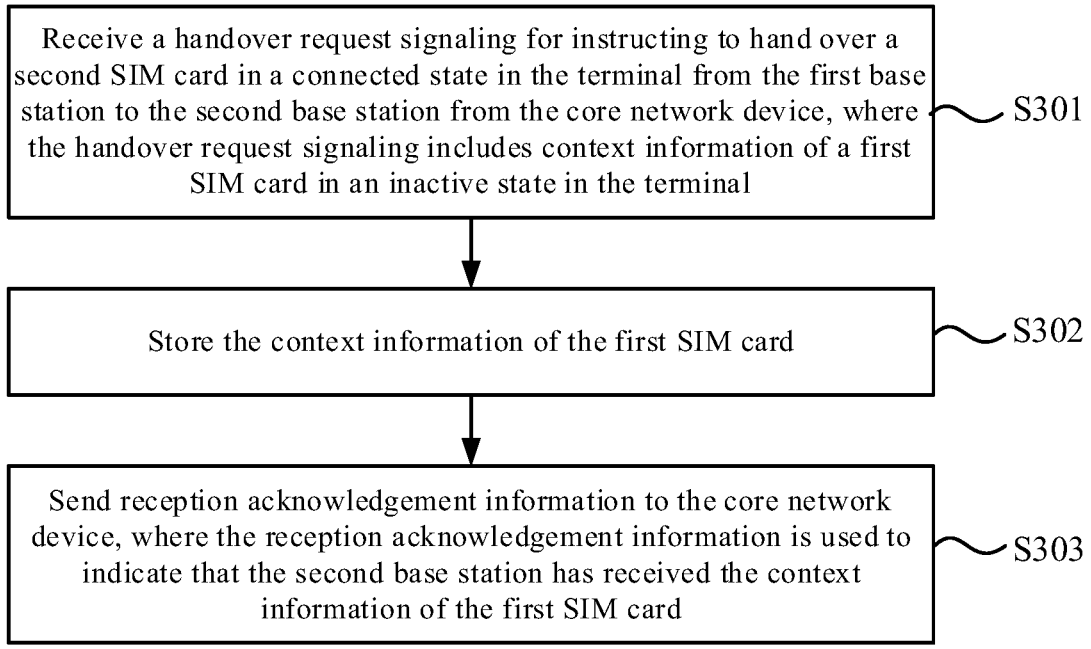
FIG. 10 is a flowchart illustrating an information receiving method according to another embodiment of the present disclosure.

FIG. 10 is a flowchart illustrating an information receiving method according to another embodiment of the present disclosure. As shown in FIG. 10, the method further includes the following steps.

At step S302, the context information of the first SIM card is stored.

At step S303, reception acknowledgement information is sent to the core network device, where the reception acknowledgement information is used to indicate that the second base station has received the context information of the first SIM card.

In an embodiment, after the second base station receives the handover request signaling from the core network device, if the second SIM card is allowed to hand over from the first base station to the second base station, the context information of the first SIM card may be stored, such that the communication with the first SIM card can be quickly resumed based on the context information of the first SIM card subsequently.

Furthermore, the reception acknowledgement information may be sent to the core network device, to inform the core network device that the second base station has received the context information of the first SIM card.

Figure 11:
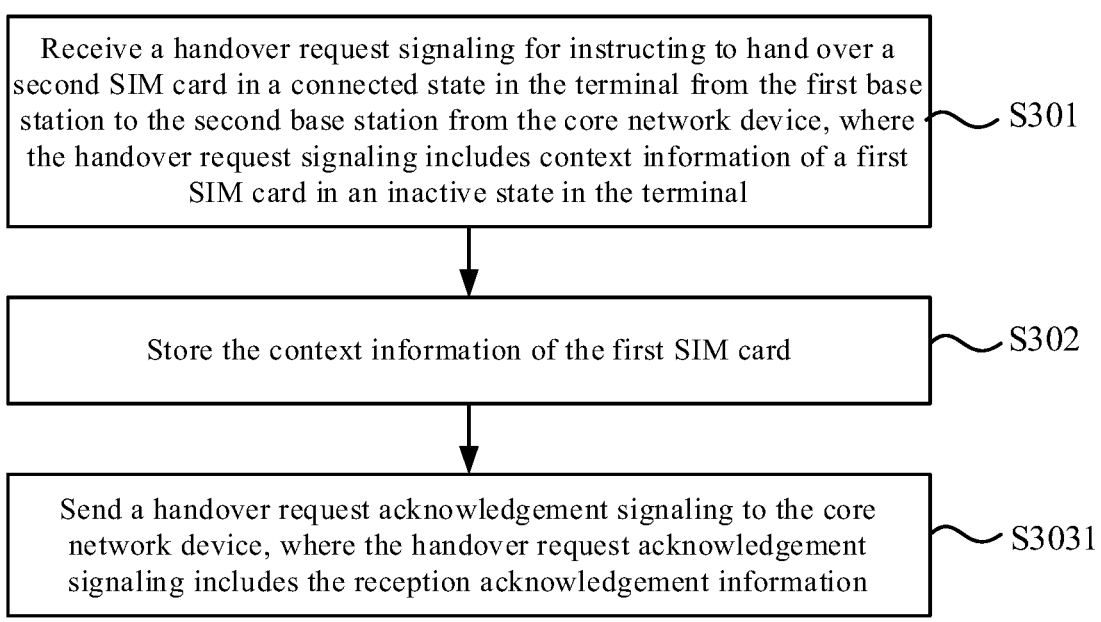
FIG. 11 is a flowchart illustrating an information receiving method according to yet another embodiment of the present disclosure.

FIG. 11 is a flowchart illustrating an information receiving method according to yet another embodiment of the present disclosure. As shown in FIG. 11, sending the reception acknowledgement information to the core network device includes:

at step S3031, a handover request acknowledgement signaling is sent to the core network device, where the handover request acknowledgement signaling includes the reception acknowledgement information.

In an embodiment, when the second SIM card is allowed to hand over from the first base station to the second base station, the second base station may send the handover request acknowledgement signaling to the core network device, such that the core network device can send a handover command signaling to the first base station. Thus, the first base station may further send the handover command signaling to the second SIM card to instruct the second SIM card to be handed over from the first base station to the second base station.

Further, the handover request acknowledgement signaling may carry the reception acknowledgement information, which is used to indicate that the second base station has received the context information of the first SIM card. Thus, the second base station does not need to send the reception acknowledgement information to the core network device through a separate signaling, the communication progress is simplified, and the communication resources are saved.

Figure 12:
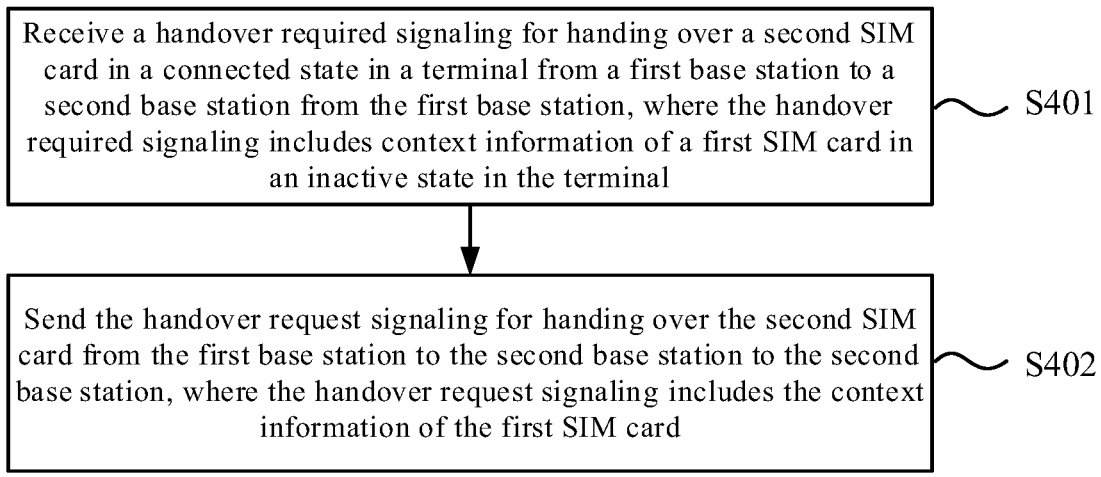
FIG. 12 is a flowchart illustrating a base station handover method according to an embodiment of the present disclosure.

FIG. 12 is a flowchart illustrating a base station handover method according to an embodiment of the present disclosure. The base station handover method in the present embodiment may be applied to a core network device, which may be specifically an instance of a core network device. The core network device may be a core network device in 5G, and can communicate with the first base station and the second base station in the preceding embodiments, where the first base station and the second base station may be 5G base stations.

As shown in FIG. 12, the base station handover method may include the following steps.

At step S401, a handover required signaling for handing over a second SIM card in a connected state in a terminal from a first base station to a second base station is received from the first base station, where the handover required signaling includes context information of a first SIM card in an inactive state in the terminal.

At step S402, the handover request signaling for handing over the second SIM card from the first base station to the second base station is sent to the second base station, where the handover request signaling includes the context information of the first SIM card.

In an embodiment, when the second SIM card needs to be handed over to the second base station, the context information of the first SIM card can be sent to the first base station. Further, when the first base station allows the second SIM card to hand over from the first base station to the second base station, the handover required signaling may be sent to the core network device through an N2 interface, where the handover required signaling carries the context information of the first SIM card.

Further, the core network device may send the handover request signaling for handing over the second SIM card from the first base station to the second base station, where the handover request signaling carries the context information of the first SIM card.

Thus, the first base station does not need to send the context information of the first SIM card to the core network device through a separate signaling, and the core network device also does not need to send the context information of the first SIM card to the second base station through a separate signaling, thereby the communication progress is simplified and the communication resources are saved.

Figure 13:
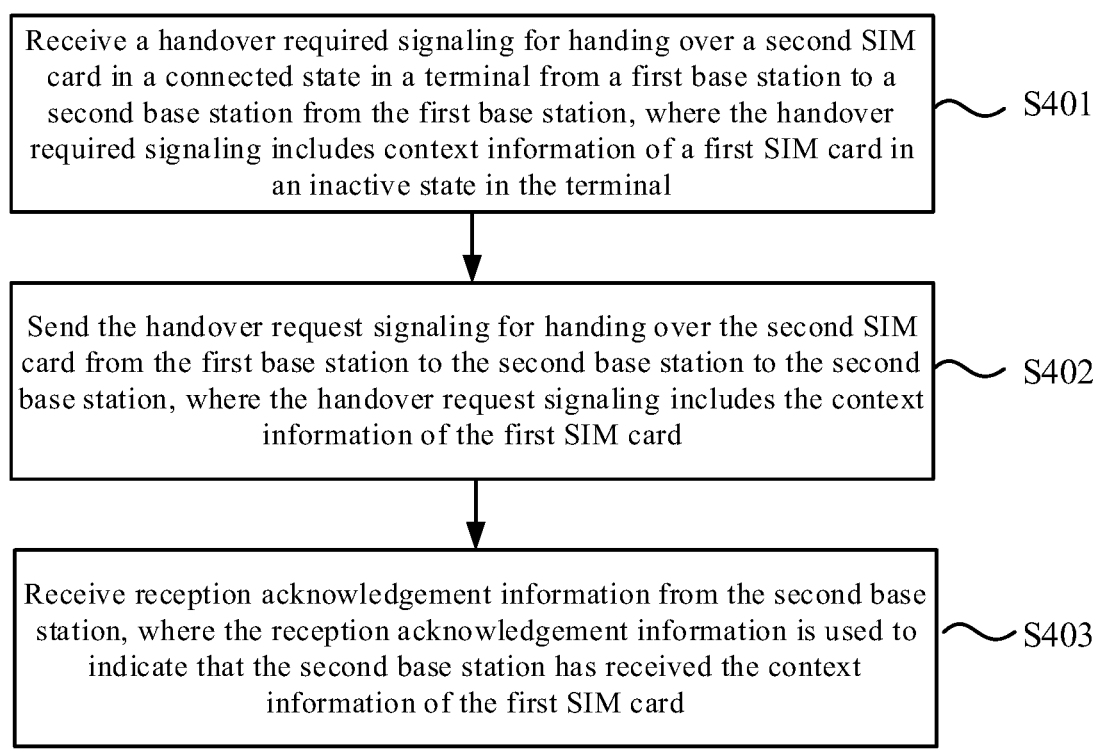
FIG. 13 is a flowchart illustrating a base station handover method according to another embodiment of the present disclosure.

FIG. 13 is a flowchart illustrating a base station handover method according to another embodiment of the present disclosure. As shown in FIG. 13, the method further includes the following step.

At step S403, reception acknowledgement information is received from the second base station, where the reception acknowledgement information is used to indicate that the second base station has received the context information of the first SIM card.

In an embodiment, the second base station may send the reception acknowledgement information to the core network device to inform the core network device that the second base station has received the context information of the first SIM card.

Figure 14:
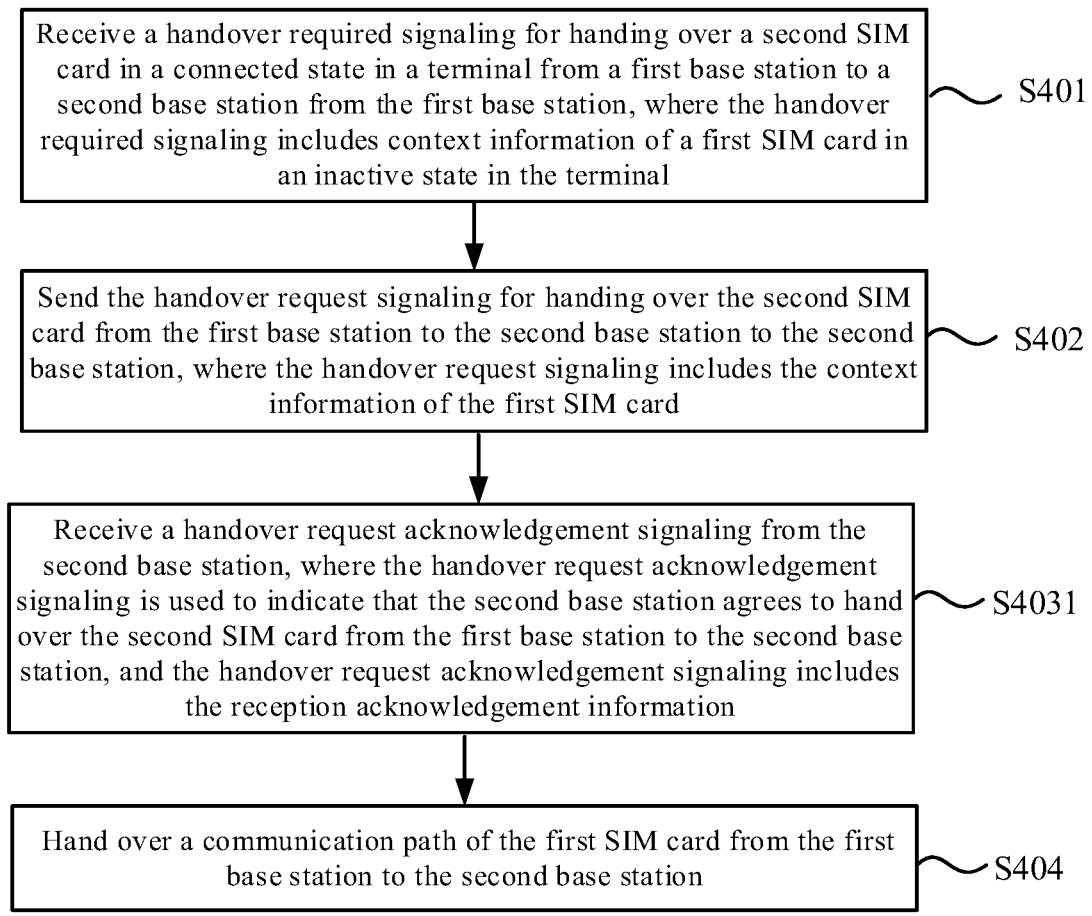
FIG. 14 is a flowchart illustrating a base station handover method according to yet another embodiment of the present disclosure.

FIG. 14 is a flowchart illustrating a base station handover method according to yet another embodiment of the present disclosure. As shown in FIG. 14, receiving the reception acknowledgement information from the second base station includes:

at step S4031, a handover request acknowledgement signaling is received from the second base station, where the handover request acknowledgement signaling is used to indicate that the second base station agrees to hand over the second SIM card from the first base station to the second base station, and the handover request acknowledgement signaling includes the reception acknowledgement information.

At step S404, a communication path of the first SIM card is handed over from the first base station to the second base station.

When the second SIM card is allowed to hand over from the first base station to the second base station, the second base station may send the handover request acknowledgement signaling to the core network device, such that the core network device can send the handover command signaling to the first base station. In this way, the first base station may further send the handover command signaling to the second SIM card to instruct the second SIM card to be handed over from the first base station to the second base station. Based on the handover request acknowledgement signaling, the core network device may determine that the second SIM card is allowed to hand over from the first base station to the second base station by the second base station. Thus, the communication path of the first SIM card can be handed over from the first base station to the second base station.

Further, the handover request acknowledgement signaling may carry the reception acknowledgement information, which is used to indicate that the second base station has received the context information of the first SIM card. Thus, the second base station does not need to send the reception acknowledgement information to the core network device through a separate signaling, the communication progress is simplified, and the communication resources are saved.

Figure 15:
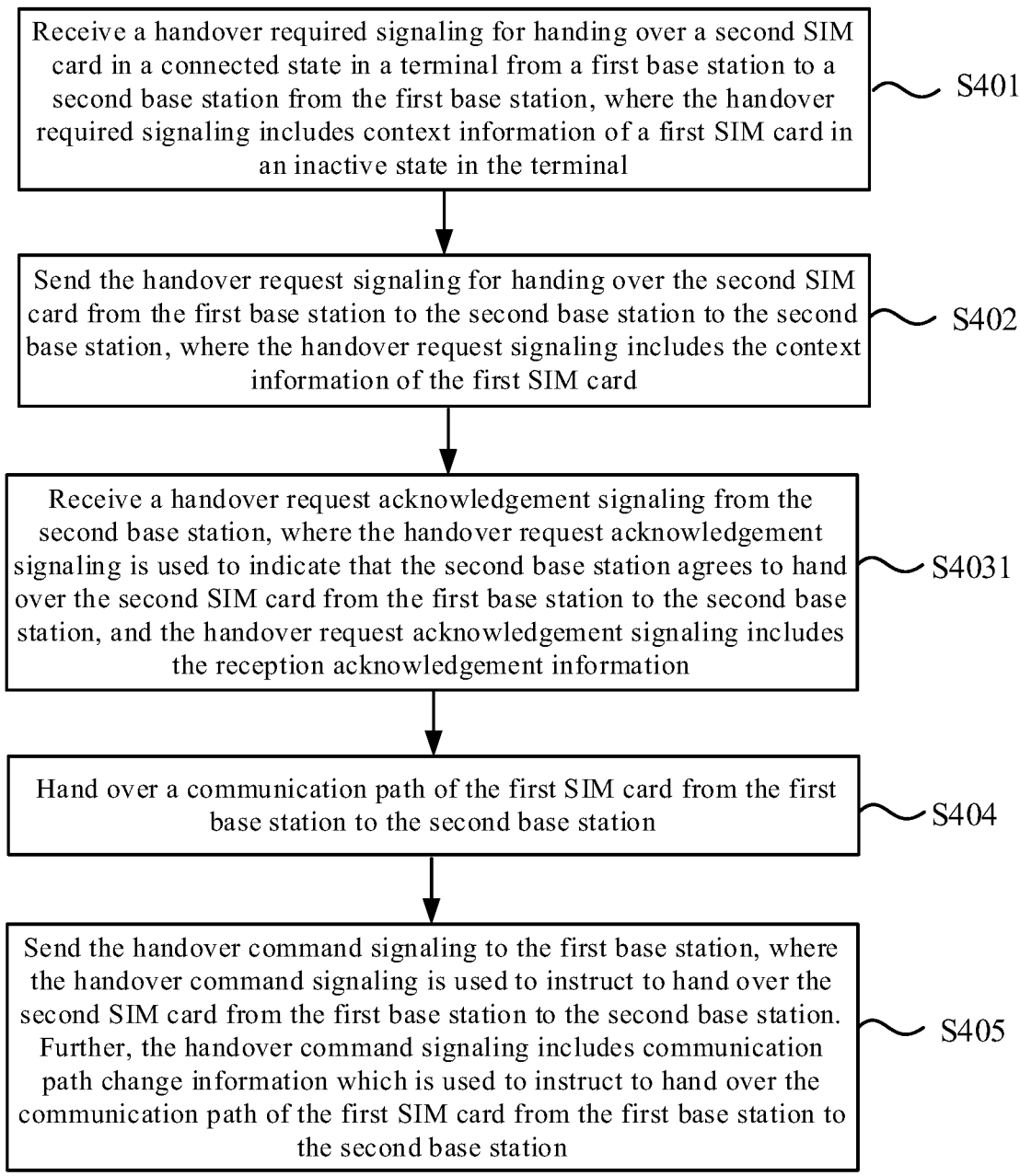
FIG. 15 is a flowchart illustrating a base station handover method according to still another embodiment of the present disclosure.

FIG. 15 is a flowchart illustrating a base station handover method according to still another embodiment of the present disclosure. As shown in FIG. 15, the method further includes:

At step S405, the handover command signaling is sent to the first base station, where the handover command signaling is used to instruct to hand over the second SIM card from the first base station to the second base station. Further, the handover command signaling includes communication path change information which is used to instruct to hand over the communication path of the first SIM card from the first base station to the second base station.

In an embodiment, if the second SIM card is allowed to hand over from the first base station to the second base station, the second base station may return a handover request acknowledgement signaling to the core network device through an N2 interface, and then the core network device sends a handover command signaling to the first base station through an N2 interface, and then the first base station sends the handover command signaling to the second SIM card to instruct the second SIM card to be handed over from the first base station to the second base station. Further, the handover command signaling may carry the communication path change information, which is used to instruct to hand over the communication path of the first SIM card with the base station from the first base station to the second base station.

Hence, the core network device does not need to send path change information to the first base station through a separate signaling, the communication progress is simplified, and the communication resources are saved.

Corresponding to the preceding embodiments of the information sending methods, the base station handover methods, and the information receiving methods, the present disclosure further provides embodiments of information sending apparatuses, base station handover apparatuses and information receiving apparatuses.

Figure 16:
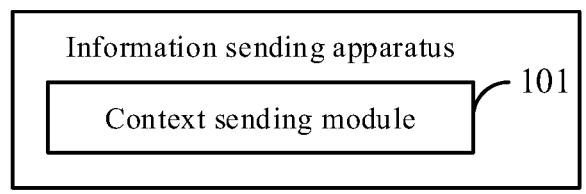
FIG. 16 is a block diagram illustrating an information sending apparatus according to an embodiment of the present disclosure.

FIG. 16 is a block diagram illustrating an information sending apparatus according to an embodiment of the present disclosure. The information sending apparatus in the present embodiment may be applied to a terminal which may serve as a user equipment to communicate with a base station. The base station may be a 5G base station, and the terminal may be an electronic device such as a smart phone, a tablet computer, and a wearable device.

As shown in FIG. 16, the information sending apparatus at least includes:
- a context sending module 101, configured to, in response to determining that the second SIM card in a connected state satisfies a handover condition for handing over the second SIM card from a first base station to a second base station, send context information of the first SIM card to the first base station through the second SIM card, where the first SIM card is in an inactive state.

Optionally, the context sending module determines, based on measurement information, that the second SIM card in the connected state satisfies the handover condition for handing over the second SIM card from the first base station to the second base station, and the context sending module is further configured to send a measurement report generated based on the measurement information to the first base station through the second SIM card, where the measurement report includes the context information of the first SIM card.

Figure 17:
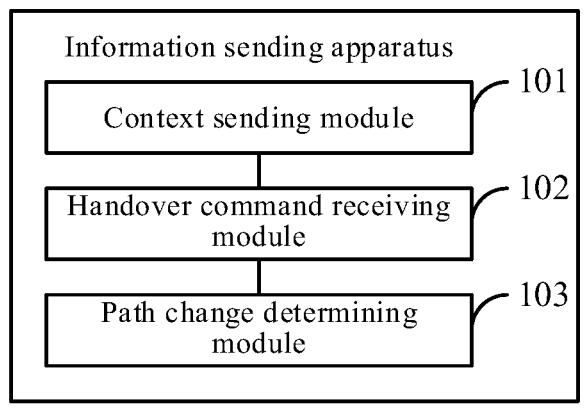
FIG. 17 is a block diagram illustrating an information sending apparatus according to another embodiment of the present disclosure.

FIG. 17 is a block diagram illustrating an information sending apparatus according to another embodiment of the present disclosure. As shown in FIG. 17, the apparatus further includes:
- a handover command receiving module 102, configured to receive a handover command signaling from the first base station through the second SIM card, where the handover command signaling is used to instruct to hand over the second SIM card from the first base station to the second base station, and the handover command signaling includes communication path change information; and
- a path change determining module 103, configured to, based on the communication path change information, determine to hand over a communication path of the first SIM card from the first base station to the second base station.

Figure 18:
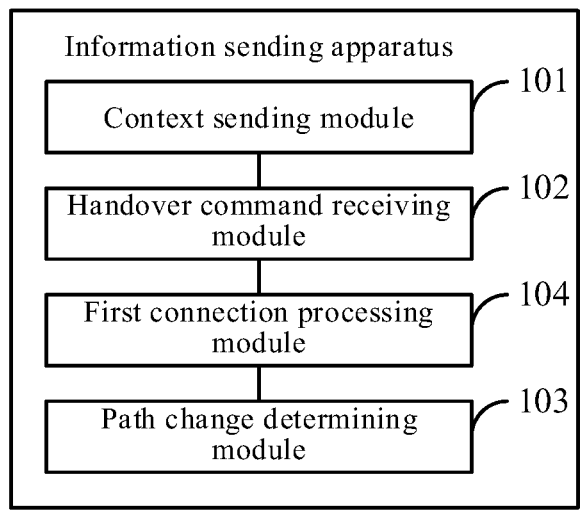
FIG. 18 is a block diagram illustrating an information sending apparatus according to yet another embodiment of the present disclosure.

FIG. 18 is a block diagram illustrating an information sending apparatus according to yet another embodiment of the present disclosure. As shown in FIG. 18, the apparatus includes:
- a first connection processing module 104, configured to, based on the handover command signaling, interrupt a communication connection with the first base station, and establish a communication connection with the second base station, by the second SIM card.

Figure 19:
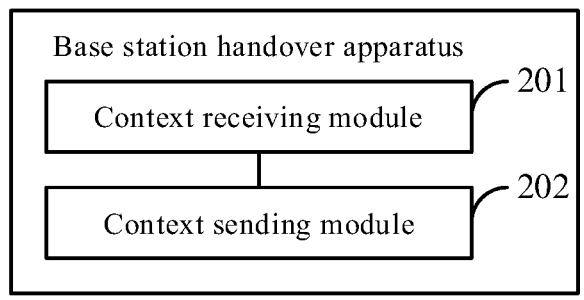
FIG. 19 is a block diagram illustrating a base station handover apparatus according to an embodiment of the present disclosure.

FIG. 19 is a block diagram illustrating a base station handover apparatus according to an embodiment of the present disclosure. The base station handover apparatus in the present embodiment may be applied to a base station which may be a 5G base station. The base station may be the first base station in the preceding embodiments and can communicate with the terminal, the core network device, and the second base station in the preceding embodiments. The terminal includes but is not limited to an electronic device such as a smart phone, a tablet computer and a wearable device.

As shown in FIG. 19, the base station handover apparatus may include:
- a context receiving module 201, configured to receive context information of a first SIM card in an inactive state in a terminal from a second SIM card in a connected state in the terminal;
- a context sending module 202, configured to send the context information of the first SIM card to a core network device.

Optionally, the context receiving module is configured to receive a measurement report from the second SIM card, where the measurement report includes the context information of the first SIM card, and the measurement report is used to instruct the first base station that the second SIM card satisfies a handover condition for handing over the second SIM card from the first base station to a second base station.

Optionally, the context sending module is configured to send to the core network device a handover required signaling for handing over the second SIM card from the first base station to the second base station, where the handover required signaling includes the context information of the first SIM card.

Figure 20:
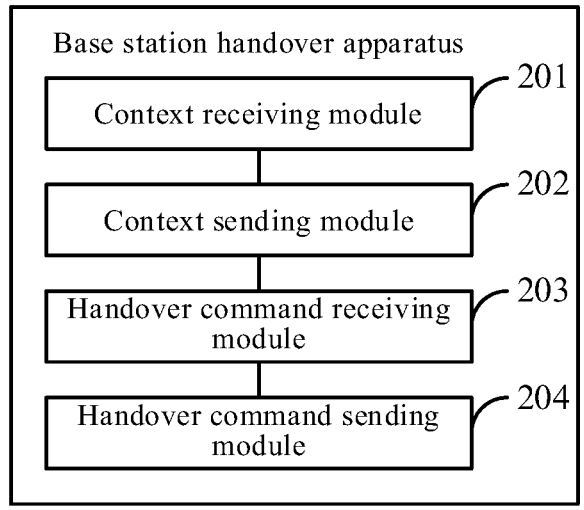
FIG. 20 is a block diagram illustrating a base station handover apparatus according to another embodiment of the present disclosure.

FIG. 20 is a block diagram illustrating a base station handover apparatus according to another embodiment of the present disclosure. As shown in FIG. 20, the apparatus further includes:
- a handover command receiving module 203, configured to receive a handover command signaling from the core network device; and
- a handover command sending module 204, configured to send the handover command signaling to the terminal, where the handover command signaling is used to instruct to hand over the second SIM card from the first base station to the second base station, the handover command signaling includes communication path change information which is used to instruct to hand over a communication path of the first SIM card from the first base station to the second base station.

Figure 21:
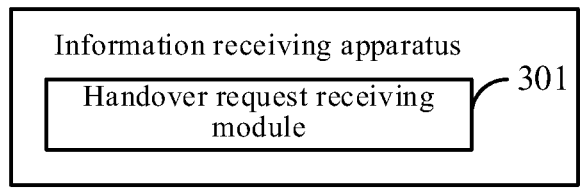
FIG. 21 is a block diagram illustrating an information receiving apparatus according to an embodiment of the present disclosure.

FIG. 21 is a block diagram illustrating an information receiving apparatus according to an embodiment of the present disclosure. The information receiving apparatus in the present embodiment may be applied to a base station which may be a 5G base station. The base station may be the second base station in the preceding embodiments and can communicate with the terminal, the core network device, and the first base station in the preceding embodiments. The terminal includes but is not limited to an electronic device such as a smart phone, a tablet computer and a wearable device.

As shown in FIG. 21, the information receiving apparatus may include:
- a handover request receiving module 301, configured to receive, from a core network device, a handover request signaling for instructing to hand over a second SIM card in a connected state in a terminal from a first base station to the second base station, where the handover request signaling includes context information of a first SIM card in an inactive state in the terminal.

Figure 22:
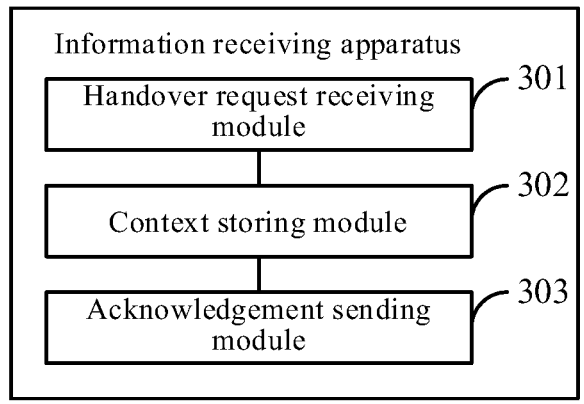
FIG. 22 is a block diagram illustrating an information receiving apparatus according to another embodiment of the present disclosure.

FIG. 22 is a block diagram illustrating an information receiving apparatus according to another embodiment of the present disclosure. As shown in FIG. 22, the apparatus further includes:

a context storing module 302, configured to store the context information of the first SIM card; and an acknowledgement sending module 303, configured to send reception acknowledgement information to the core network device, where the reception acknowledgement information is used to indicate that the second base station has received the context information of the first SIM card.

Optionally, the request acknowledgement sending module is configured to send a handover request acknowledgement signaling to the core network device, where the handover request acknowledgement signaling includes the reception acknowledgement information.

Figure 23:
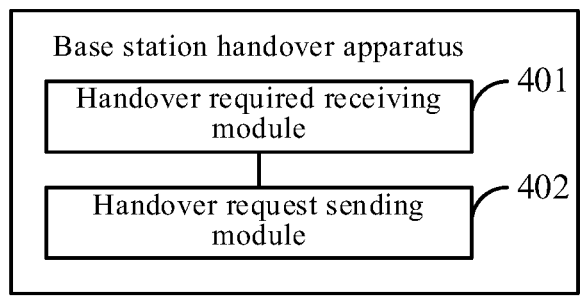
FIG. 23 is a block diagram illustrating a base station handover apparatus according to an embodiment of the present disclosure.

FIG. 23 is a block diagram illustrating a base station handover apparatus according to an embodiment of the present disclosure. The base station handover apparatus in the present embodiment may be applied to a core network device, which may be an instance of a core network device. The core network device may be a core network device in 5G and can communicate with the first base station and the second base station in the preceding embodiments. The first base station and the second base station may be 5G base stations.

As shown in FIG. 23, the base station handover apparatus may include:

a handover required receiving module 401, configured to receive, from a first base station, a handover required signaling for handing over a second SIM card in a connected state in a terminal from a first base station to a second base station, where the handover required signaling includes context information of a first SIM card in an inactive state in the terminal;

a handover request sending module 402, configured to send to the second base station a handover request signaling for handing over the second SIM card from the first base station to the second base station, where the handover request signaling includes the context information of the first SIM card.

Figure 24:
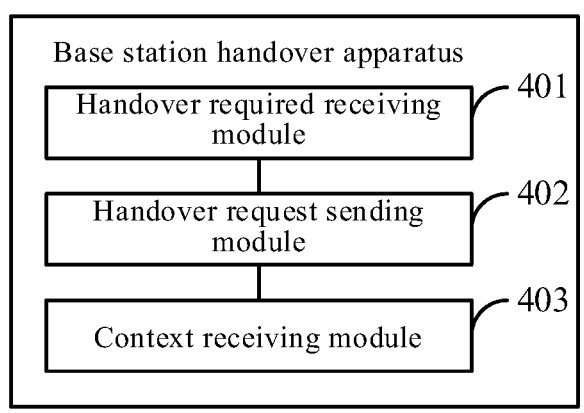
FIG. 24 is a block diagram illustrating a base station handover apparatus according to another embodiment of the present disclosure.

FIG. 24 is a block diagram illustrating a base station handover apparatus according to another embodiment of the present disclosure. As shown in FIG. 24, the apparatus further includes:

a context receiving module 403, configured to receive reception acknowledgement information from the second base station, where the reception acknowledgement information is used to indicate that the second base station has received the context information of the first SIM card.

Figure 25:
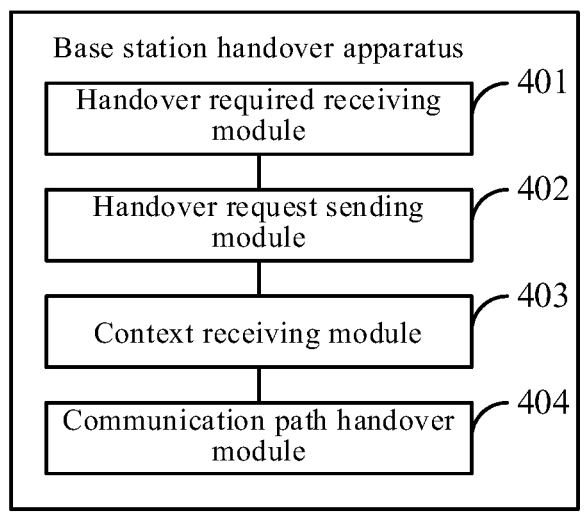
FIG. 25 is a block diagram illustrating a base station handover apparatus according to yet another embodiment of the present disclosure.

FIG. 25 is a block diagram illustrating a base station handover apparatus according to yet another embodiment of the present disclosure. As shown in FIG. 25, the context receiving module 403 is configured to receive a handover request acknowledgement signaling from the second base station, where the handover request acknowledgement signaling is used to indicate that the second base station agrees to hand over the second SIM card from the first base station to the second base station, and the handover request acknowledgement signaling includes the reception acknowledgement information.

The apparatus further includes:

a communication path handover module 404, configured to hand over a communication path of the first SIM card from the first base station to the second base station.

Figure 26:
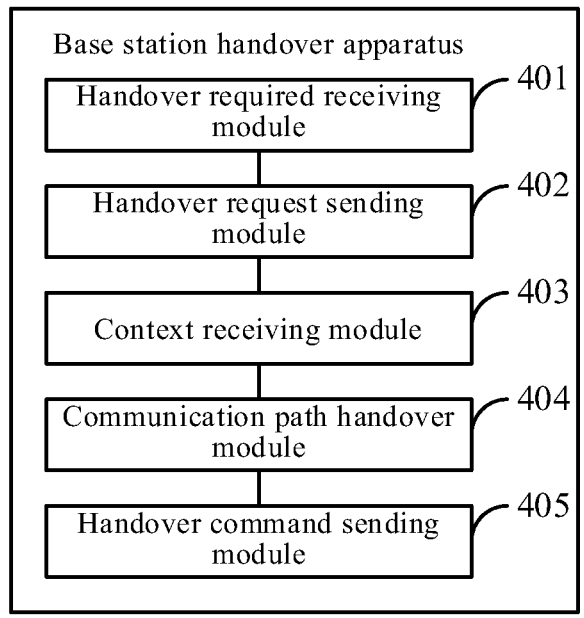
FIG. 26 is a block diagram illustrating a base station handover apparatus according to still another embodiment of the present disclosure.

FIG. 26 is a block diagram illustrating a base station handover apparatus according to still another embodiment of the present disclosure. As shown in FIG. 26, the apparatus further includes:

a handover command sending module 405, configured to send a handover command signaling to the first base station, where the handover command signaling is used to instruct to hand over the second SIM card from the first base station to the second base station, and the handover command signaling includes communication path change information which is used to instruct to hand over a communication path of the first SIM card from the first base station to the second base station.

The specific manner in which the modules in the apparatus of the above embodiments perform operations is already detailed in the relevant method embodiments and will not be repeated herein.

Since the apparatus embodiments substantially correspond to the method embodiments, reference may be made to part of the descriptions of the method embodiments for the related part. The apparatus embodiments described above are merely illustrative, where the modules described as separate members may be or not be physically separated, and the members displayed as modules may be or not be physical, modules, i.e., may be located in one place, or may be distributed to a plurality of network modules. Part or all of the modules may be selected according to actual requirements to implement the objectives of the solutions in the embodiments. Those of ordinary skill in the art may understand and carry out them without creative work.

An embodiment of the present disclosure further provides an electronic device, including:

a processor;

a memory, storing instructions executable by the processor;

where the processor is configured to perform the method of any one of the above embodiments.

An embodiment of the present disclosure further provides a computer readable storage medium, storing computer programs thereon, where the programs are executed by a processor to perform the method of any one of the above embodiments.

Figure 27:
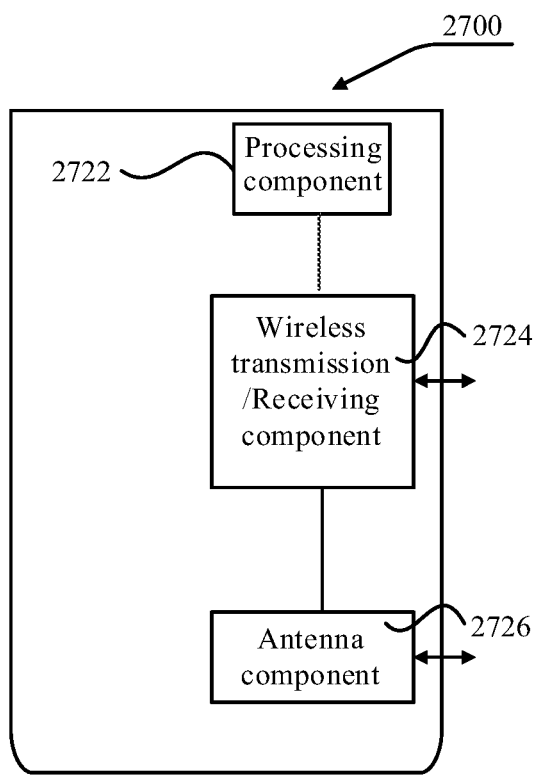
FIG. 27 is a schematic diagram illustrating a device for handing over base station and/or receiving information according to an embodiment of the present disclosure.

As shown in FIG. 27, FIG. 27 is a schematic diagram illustrating a device 2700 for handing over base station and/or receiving information according to an embodiment of the present disclosure. The device 2700 may be provided as a base station. By referring to FIG. 27, the device 2700 includes a processing component 2722, a wireless transmission/receiving component 2724, an antenna component 2726, and a signal processing part specific to wireless interface. The processing component 2722 may further include one or more processors. One of the processors in the processing component 2722 may be configured to perform the base station handover method and/or information receiving method according to any one of the above embodiments.

Figure 28:
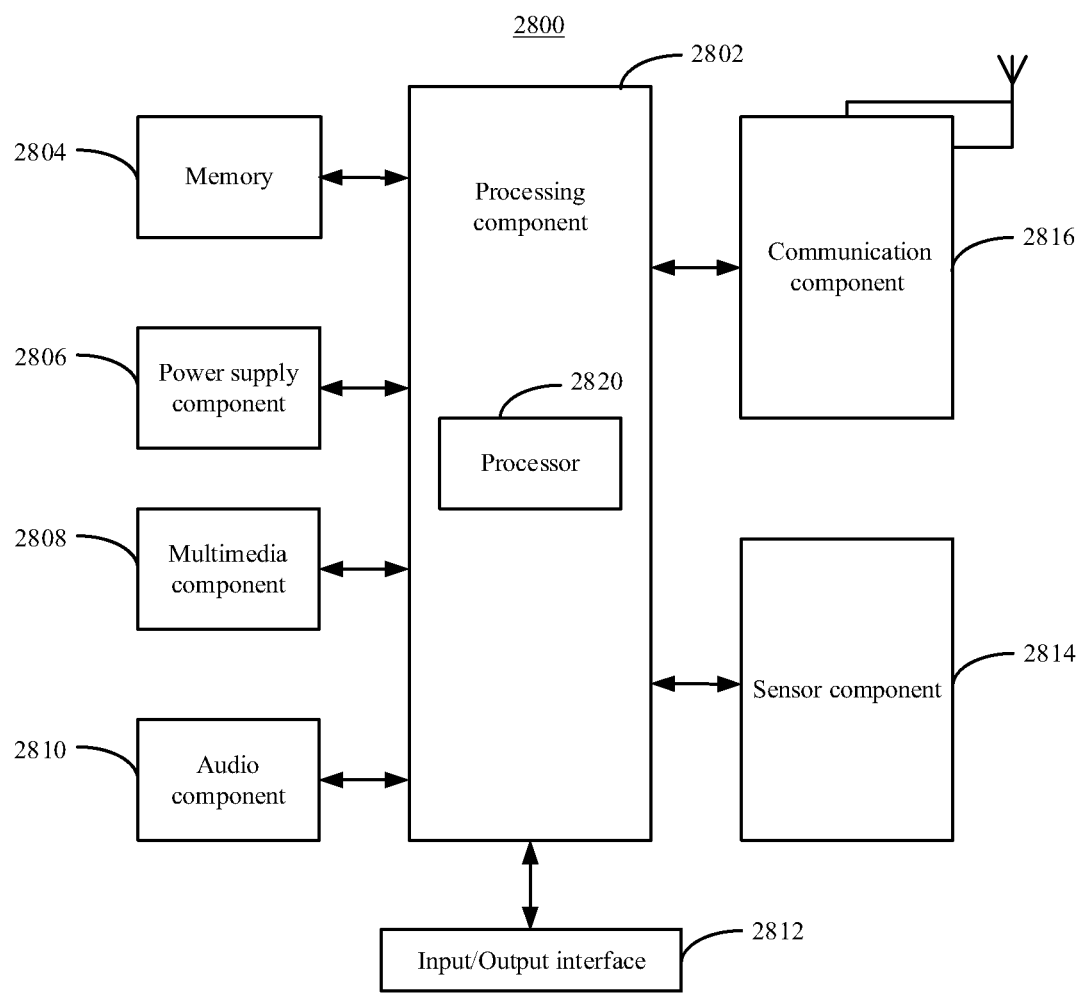
FIG. 28 is a schematic diagram illustrating a device for sending information according to an embodiment of the present disclosure.

FIG. 28 is a schematic diagram illustrating a device 2800 for sending information according to an embodiment of the present disclosure. For example, the device 2800 may be a mobile phone, a computer, a digital broadcast terminal, a message transceiver, a game console, a tablet device, a medical device, a fitness device, a personal digital assistant, and the like.

As shown in FIG. 28, the device 2800 may include one or more of the following components: a processing component 2802, a memory 2804, a power supply component 2806, a multimedia component 2808, an audio component 2810, an input/output (I/O) interface 2812, a sensor component 2814 and a communication component 2816.

The processing component 2802 generally controls overall operations of the device 2800, such as operations associated with display, phone calls, data communications, camera operations, and recording operations. The processing component 2802 may include one or more processors 2820 to execute instructions to complete all or part of the steps of the above methods. In addition, the processing component 2802 may include one or more modules that facilitate the interaction between the processing component 2802 and other components. For example, the processing component 2802 may include a multimedia module to facilitate the interaction between the multimedia component 2808 and the processing component 2802.

The memory 2804 is configured to store various types of data to support the operation of the device 2800. Examples of such data include instructions for any application or method operated on the device 2800, contact data, phonebook data, messages, pictures, videos, and so on. The memory 2804 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or compact disk.

The power supply component 2806 supplies power for different components of the device 2800. The power supply component 2806 may include a power supply management system, one or more power supplies, and other components associated with generating, managing and distributing power for the device 2800.

The multimedia component 2808 includes a screen that provides an output interface between the device 2800 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2808 includes a front camera and/or a rear camera. When the device 2800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2810 is configured to output and/or input audio signals. For example, the audio component 2810 includes a microphone (MIC) configured to receive an external audio signal when the device 2800 is in an operation mode, such as a call mode, a recording mode, and a voice recognition mode. The received audio signal may be further stored in the memory 2804 or transmitted via the communication component 2816. In some examples, the audio component 2810 also includes a loudspeaker for outputting an audio signal.

The I/O interface 812 provides an interface between the processing component 802 and a peripheral interface module which may be a keyboard, a click wheel, a button, or the like. These buttons may include, but are not limited to a home button, a volume button, a start button, and a lock button.

The sensor component 2814 includes one or more sensors for providing a status assessment in various aspects to the device 2800. For example, the sensor component 2814 may detect an open/closed state of the device 2800, and the relative positioning of components, for example, the component is a display and a keypad of the device 2800. The sensor component 2814 may also detect a change in position of the device 2800 or a component of the device 2800, the presence or absence of a user in contact with the device 2800, the orientation or acceleration/deceleration of the device 2800 and a change in temperature of the device 2800. The sensor component 2814 may include a proximity sensor configured to detect the presence of nearby objects without any physical contact. The sensor component 2814 may also include a light sensor, such as a CMOS or CCD image sensor, for use in imaging applications. In some examples, the sensor component 2814 may also include an acceleration sensor, a gyro sensor, a magnetic sensor, a pressure sensor, or a temperature sensor.

The communication component 2816 is configured to facilitate wired or wireless communication between the device 2800 and other devices. The device 2800 may access a wireless network based on a communication standard, such as WiFi, 2G or 3G, or 4GLTE, or 5G NR or a combination thereof. In an example, the communication component 816 receives broadcast signals or broadcast associated information from an external broadcast management system via a broadcast channel. In an example, the communication component 2816 also includes a near field communication (NFC) module to facilitate short range communication. For example, the NFC module may be implemented based on a radio frequency identification (RFID) technology, an infrared data association (IrDA) technology, an ultrawideband (UWB) technology, Bluetooth (BT) technology, and other technologies.

In an example, the device 2800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above information sending methods.

In an example, there is provided a non-transitory computer-readable storage medium storing instructions, for example, the memory 2804 storing instructions. The instructions may be executed by the processor 2820 of the device 2800 to complete the above information sending methods. For example, the non-transitory computer readable storage medium may be a Read-Only Memory (ROM), a Random Access Memory (RAM), CD-ROM, a magnetic tape, a floppy disk, and an optical data storage device and so on.

Other implementations of the present disclosure will be apparent to those skilled in the art from consideration of the specification and practice of the present disclosure herein. The present disclosure is intended to cover any variations, uses, modifications or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of the methods and apparatuses provided according to the embodiments of the present disclosure. Specific examples are used herein to set forth the principles and the implementing methods of the present disclosure, and the descriptions of the above embodiments are only meant to help understanding of the methods and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. An information sending method, applied to a terminal, and comprising:
in response to a determination that a second SIM card in a connected state satisfies a handover condition for handing over the second SIM card from a first base station to a second base station, sending context information of a first SIM card to the first base station through the second SIM card, wherein the first SIM card is in an inactive state.

2. The method of claim 1, wherein:
the determination is performed based on measurement information, and
the sending the context information of the first SIM card to the first base station through the second SIM card comprises:
sending a measurement report generated based on the measurement information to the first base station through the second SIM card, wherein the measurement report comprises the context information of the first SIM card.

3. The method of claim 1, further comprising:
receiving a handover command signaling from the first base station through the second SIM card, wherein the handover command signaling is used to instruct the terminal to hand over the second SIM card from the first base station to the second base station, and the handover command signaling comprises communication path change information; and
based on the communication path change information, determining to hand over a communication path of the first SIM card from the first base station to the second base station.

4. The method of claim 3, further comprising:
based on the handover command signaling, interrupting a communication connection with the first base station, and establishing the communication connection with the second base station, by the second SIM card.

5. A non-transitory computer readable storage medium, storing a computer program, wherein the computer program when executed by a processor cause the processor to perform the method of claim 1.

6. A base station handover method, applied to a first base station, and comprising:
receiving context information of a first SIM card in an inactive state in a terminal from a second SIM card in a connected state in the terminal; and
sending the context information of the first SIM card to a core network device.

7. The method of claim 6, wherein the receiving the context information of the first SIM card in the inactive state in the terminal from the second SIM card in the connected state in the terminal comprises:
receiving a measurement report from the second SIM card, wherein the measurement report comprises the context information of the first SIM card, and the measurement report is used to instruct the first base station that the second SIM card satisfies a handover condition for handing over the second SIM card from the first base station to a second base station.

8. The method of claim 7, wherein the sending the context information of the first SIM card to the core network device comprises:
sending to the core network device a handover required signaling for handing over the second SIM card from the first base station to the second base station, wherein the handover required signaling comprises the context information of the first SIM card.

9. The method of claim 8, further comprising:
receiving a handover command signaling from the core network device; and
sending the handover command signaling to the terminal, wherein the handover command signaling is used to instruct the terminal to hand over the second SIM card from the first base station to the second base station, the handover command signaling comprises communication path change information which is used to instruct to hand over a communication path of the first SIM card from the first base station to the second base station.

10. A non-transitory computer readable storage medium, storing a computer program, wherein the computer program when executed by a processor cause the processor to perform the method of claim 6.

11. An information receiving method, applied to a second base station, and comprising:
receiving, from a core network device, a handover request signaling for instructing to hand over a second SIM card in a connected state in a terminal from a first base station to the second base station, wherein the handover request signaling comprises context information of a first SIM card in an inactive state in the terminal.

12. The method of claim 11, further comprising:
storing the context information of the first SIM card; and
sending reception acknowledgement information to the core network device, wherein the reception acknowledgement information is used to indicate that the second base station has received the context information of the first SIM card.

13. The method of claim 12, wherein the sending the reception acknowledgement information to the core network device comprises:
sending a handover request acknowledgement signaling to the core network device, wherein the handover request acknowledgement signaling comprises the reception acknowledgement information.

14. A non-transitory computer readable storage medium, storing a computer program, wherein the computer program when executed by a processor cause the processor to perform the method of claim 11.

15. A base station handover method, applied to a core network device, and comprising:
  receiving, from a first base station, a handover required signaling for handing over a second SIM card in a connected state in a terminal from the first base station to a second base station, wherein the handover required signaling comprises context information of a first SIM card in an inactive state in the terminal; and
  sending to the second base station a handover request signaling for handing over the second SIM card from the first base station to the second base station, wherein the handover request signaling comprises the context information of the first SIM card.

16. The method of claim 15, further comprising:
  receiving reception acknowledgement information from the second base station, wherein the reception acknowledgement information is used to indicate that the second base station has received the context information of the first SIM card.

17. The method of claim 16, wherein the receiving the reception acknowledgement information from the second base station comprises:
  receiving a handover request acknowledgement signaling from the second base station, wherein the handover request acknowledgement signaling is used to indicate that the second base station agrees to hand over the second SIM card from the first base station to the second base station, and the handover request acknowledgement signaling comprises the reception acknowledgement information; and
  handing over a communication path of the first SIM card from the first base station to the second base station.

18. The method of claim 17, further comprising:
  sending a handover command signaling to the first base station, wherein the handover command signaling is used to instruct the terminal to hand over the second SIM card from the first base station to the second base station, and the handover command signaling comprises communication path change information which is used to instruct to hand over the communication path of the first SIM card from the first base station to the second base station.

19. A non-transitory computer readable storage medium, storing a computer program, wherein the computer program when executed by a processor cause the processor to perform the method of claim 15.

* * * * *

UNITED STATES PATENT AND TRADEMARK OFFICE
CERTIFICATE OF CORRECTION

| | | |
|---|---|---|
| PATENT NO. | : 12,445,921 B2 | Page 1 of 1 |
| APPLICATION NO. | : 17/926308 | |
| DATED | : October 14, 2025 | |
| INVENTOR(S) | : Wei Hong | |

It is certified that error appears in the above-identified patent and that said Letters Patent is hereby corrected as shown below:

On the Title Page

On Page 2, in Item (56), under "OTHER PUBLICATIONS", in Column 2, Lines 5-7, delete "11 pages. People's Republic of China, Office Action and Search Report Issued in 20, 2023, 15 pages." and insert -- 11 pages. --, therefor.

Signed and Sealed this
Second Day of December, 2025

John A. Squires
*Director of the United States Patent and Trademark Office*